Aug. 24, 1965  E. L. HOLBROOK  3,202,170

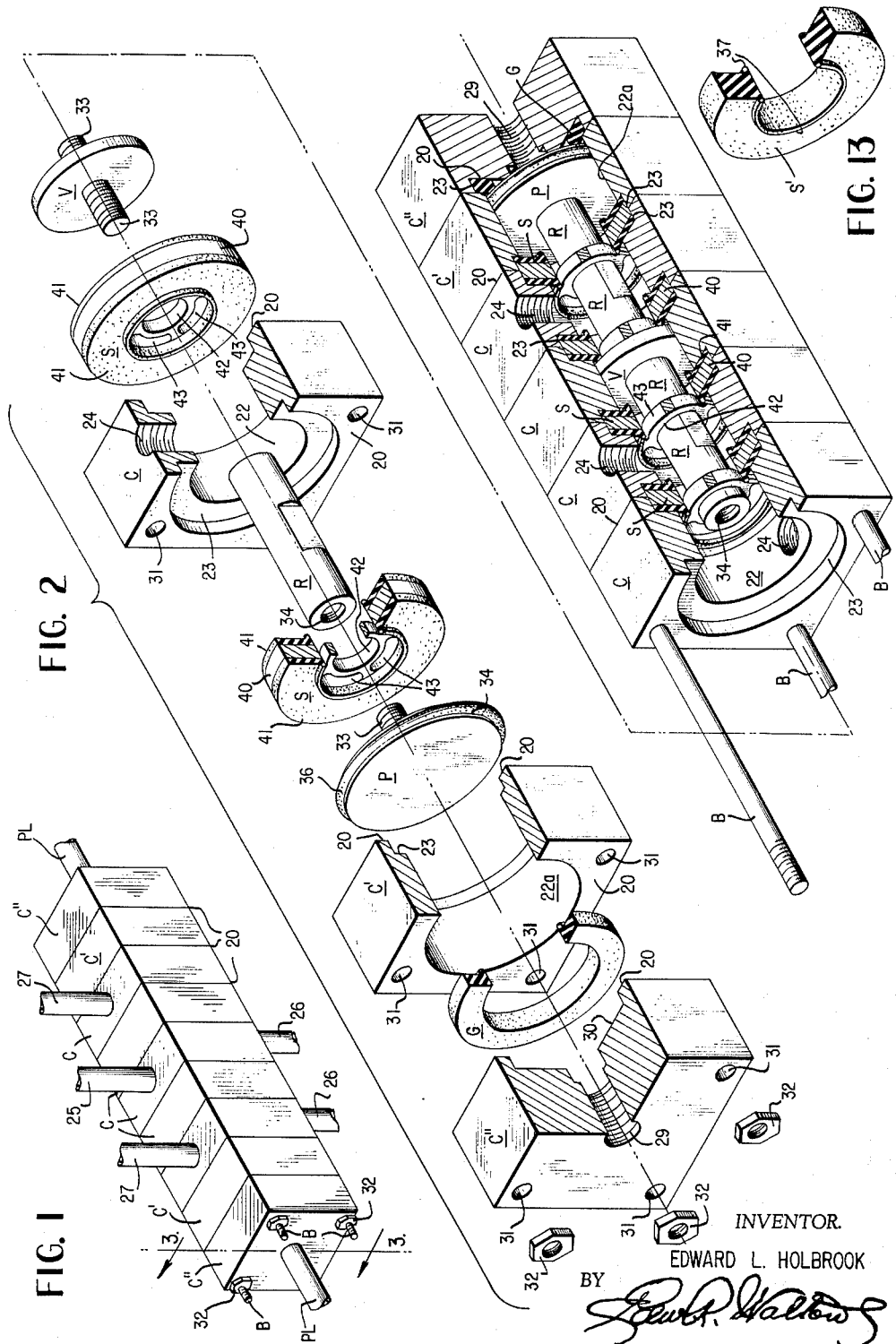

VALVE ASSEMBLY OF INTERCHANGEABLE PARTS

Filed Nov. 28, 1962  4 Sheets-Sheet 2

INVENTOR.
EDWARD L. HOLBROOK

BY

ATTORNEY

Aug. 24, 1965  E. L. HOLBROOK  3,202,170
VALVE ASSEMBLY OF INTERCHANGEABLE PARTS
Filed Nov. 28, 1962  4 Sheets-Sheet 3
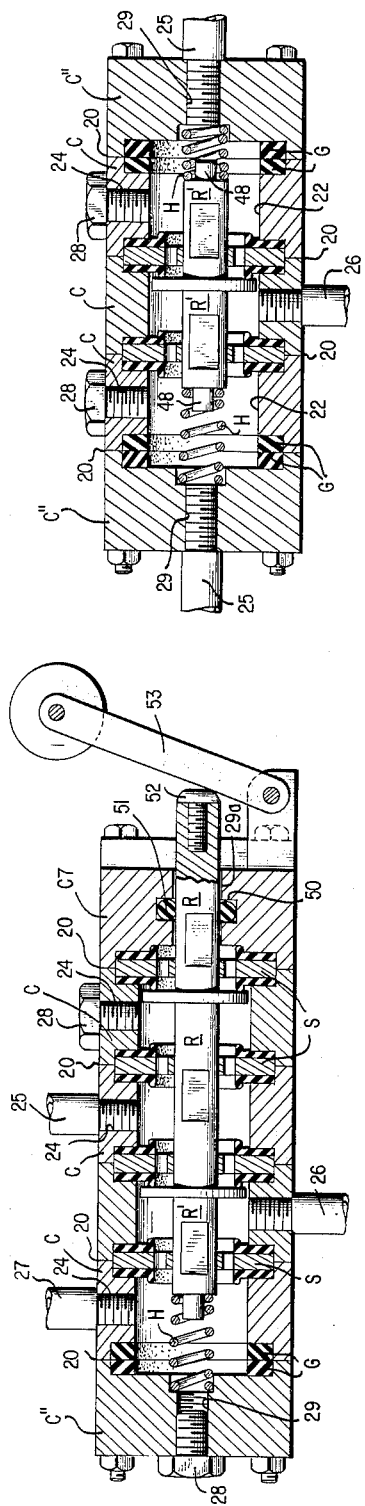
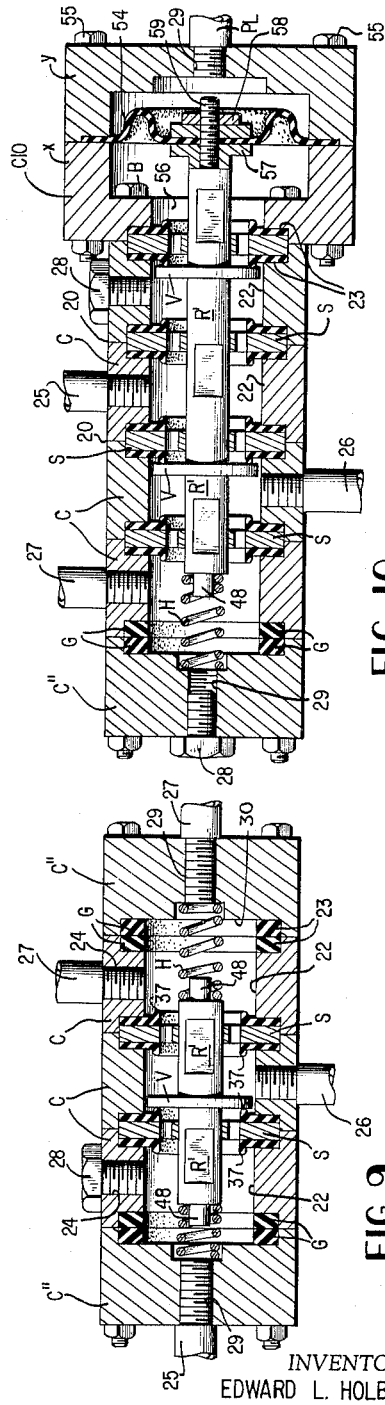
INVENTOR.
EDWARD L. HOLBROOK
BY
ATTORNEY Aug. 24, 1965   E. L. HOLBROOK   3,202,170
VALVE ASSEMBLY OF INTERCHANGEABLE PARTS
Filed Nov. 28, 1962   4 Sheets-Sheet 4
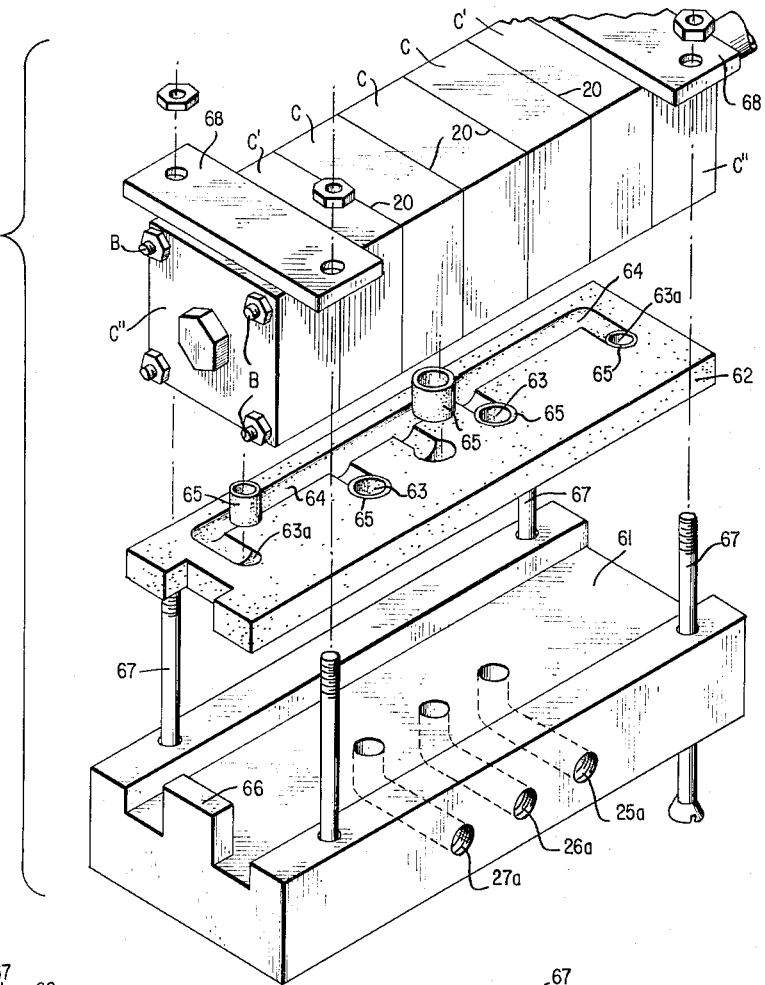
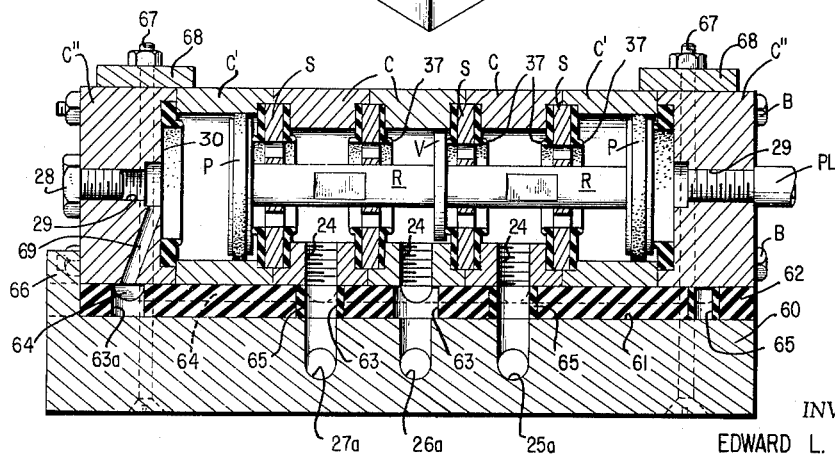
INVENTOR.
EDWARD L. HOLBROOK
BY
ATTORNEY

United States Patent Office 3,202,170
Patented Aug. 24, 1965

3,202,170
VALVE ASSEMBLY OF INTERCHANGEABLE PARTS
Edward L. Holbrook, Greenville, S.C.
(9388 Daly Road, Cincinnati, Ohio)
Filed Nov. 28, 1962, Ser. No. 240,519
23 Claims. (Cl. 137—269)

The present invention relates broadly to valves for controlling the passage of fluid and relates more particularly to an improved assembly of sectionalized interchangeable parts from which most, if not all, of the needed varieties of control valves can be built-up in miniature form for employment in fluid logic circuitry.

It is becoming increasingly apparent that electrical and electronic control systems have been over-extended in the automation of certain machinery and their failures to perform adequately are many, especially where hazardous or rough environmental conditions exist, as for instance when volatile fluid, dust and/or lint are present, which create havoc in electrical logic control equipment. Dust-proof and/or explosion-proof electrical components are not only expensive to obtain and install but are expensive to maintain in operation. On the other hand, pneumatic logic-control systems are far cheaper, more reliable and have greater operational life in such situations with a very low maintenance cost; and, despite the inadequacy of the fluid control valve structures now available (including their relatively large size and high cost as compared with the improvement of this invention), the change-over from electrical control to pneumatic control is progressing steadily.

The prime and broad object of the invention is the provision of a multiplicity of different multi-way valves all of which are assembled from a plurality of interchangeable low-cost tubular sections to form a casing, of interchangeable valve seats adapted to be removably fixed in spaced relation within the casing and of identical low-cost poppet valve members interconnected by detachable coupling rods or stems to form a tandem grouping of valve members, to cooperate with opposing faces of the valve seats, as required by the type of valve to be assembled and the function to be performed thereby, thus eliminating the necessity of stocking a number of different types of complete valves or a number of parts for a different valve, reducing the overall cost of manufacture, simplifying the manufacture and distribution of parts, and simplifying the maintenance of inventories by the manufaucturer, by the dealers and by the users, and permitting rapid changes in any valve as might be required in the application of pneumatic or fluid circuitry.

Another object or improved feature of this invention is the provision of such an assembly, as just mentioned, wherein the valve members are discs of a diameter to provide sufficient clearance between their circumference and the surface of the passage in the valve casing as will not cause rutting of the surface of said passage, and wherein the valve seats are annular members of a yieldable material projecting in said passage at spaced intervals to form stops against which the faces of the valve members abut and cooperate to form a seal.

More specifically the object of this invention is the provision of groups of different transverse sections of a valve-casing, the sections of one group being interchangeable with the sections of the other groups; interchangeable members of yieldable material formed and adapted to be disposed between the casing sections to form gaskets therefor and extend into the passage in the casing to form valve-seats; a group of identical and separate poppet-type valve members, a group of identical piston-heads, and a group of separate interchangeable valve coupling-rods of different length, each valve member being adapted to be disposed in a casing section between opposing faces of adjacent seats to cooperate with said faces and detachably interconnected by said coupling rods to adjacent valve members and/or piston-head to shift the valve-member assembly in tandem and unison, as required, whereby a variety of multi-way low-cost miniature valves may be assembled from a selection of said interchangeable separate parts for use in pneumatic logic circuitry or the like.

Other objects, advantages and features of the invention will be apparent from the following detail description thereof, when read in connection with the accompanying drawing; and the invention resides in the sundry details of construction and combination or organization of parts herein described and pointed out in the appended claims.

In the accompanying drawings, which illustrates the invention as at present devised:

FIGURE 1 is a perspective view illustrating an assembly of parts forming a 4-way double air-piloted valve in accordance with the present invention;

FIGURE 2 is an enlarged divided perspective view of the valve shown in FIGURE 1, with a portion having its parts in exploded position and another portion being in assembled position, to illustrate the manner of assembly and with some of parts in section to show details of construction and the organization of the parts;

Figure 5:
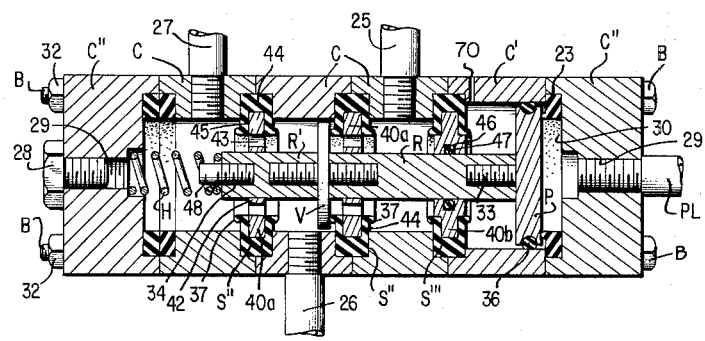
Figure 6:
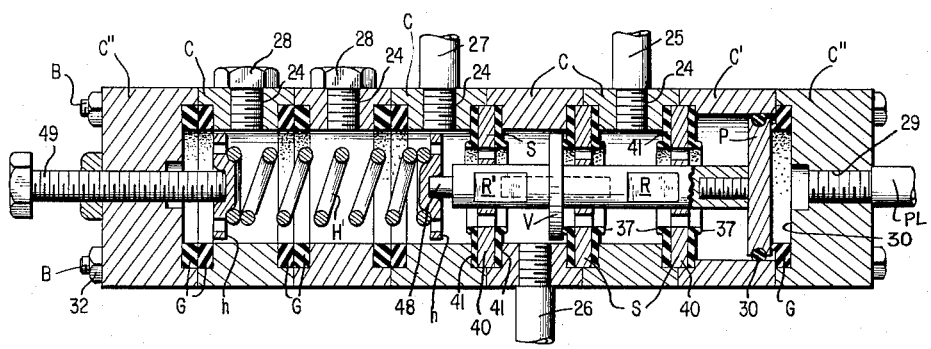
Figure 5A:
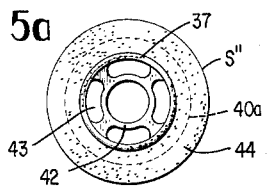
Figure 5B:
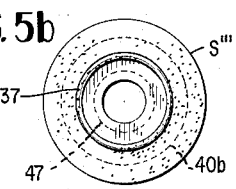

FIGURE 5 is a longitudinal sectional view of a single air-piloted, spring-return 3-way valve which is assembled from a selection of the same identical parts which form the valve shown in FIGS. 1 to 4, inclusive, except for the addition of a helical return-spring, a modified valve coupling rod, and illustrating modified valve seats which are interchangeable with the valve seats shown in FIGS. 1 to 4;

FIGURE 5a is a side elevation of a modified valve member S″ shown in FIGURE 5;

FIGURE 5b is a side elevation of another modified valve member S‴, shown in FIGURE 5;

FIGURE 6 is a longitudinal section view of a single air-piloted variable spring-return 3-way valve which is assembled from a selection of the same identical parts as is the valve shown in FIGURE 2, with the addition of a helical return spring, abutment pads for said spring and an adjusting screw to vary the compression on said spring;

FIGURES 7, 8, 9 and 10 show, respectively, longitudinal sectional views of a cam-operated spring-return 3-way valve, of a shuttle valve, of a quick release valve and of large-area diaphragm operated, spring-return 3-way valve, all of which being assembled from the parts previously shown, thus illustrating the versatility of sectional interchangeable parts of this invention;

FIGURE 11 is an exploded perspective view showing a base-plate for the valves, when required, the particular valve shown in connection therewith being a 3-way single air-piloted air-returned valve;

FIGURE 12 is a longitudinal sectional view of the parts, shown in FIGURE 11, in assembled position; and FIGURE 13 is a perspective view of a still further modified combined gasket and valve seat S′.

In describing the invention in detail, like characters of reference will refer to similar and like parts throughout the several views of the drawings.

As indicated above, a multiplicity of fluid control multi-way valves (including the ones illustrated by way of example and others not shown) may be constructed or assembled by a selection from several groups of preformed identical and interchangeable parts, having a unique construction and arrangement, which not only allows such valves to be produced of miniature size with a minimum of wearable parts, but said parts may be produced with a fairly wide range of tolerances, thereby reducing the requirement of many machining operations and, hence, quality-control costs while operating with low friction resistance and without lubrication.

The essential sectional parts, which may be employed in constructing a variety of multi-way valves, according to the invention, are shown, for the most part, in FIGURE 2 and comprise casing body sections C, piston-cylinder sections C′, casing end-caps C″, valve members V, valve coupling rods or stems R, gaskets G, valve seats S, S′, S″ and S‴ (shown in FIGS. 2, 13, 5a and 5b respectively), piston heads P, stay-bolts B and nuts 32 therefor. In addition to these parts, compressible helical springs H may be employed for loading or biasing the valve member and/or piston assemblies, shown by way of example in FIGS. 5, 7, 8, 9 and 10, as well as employing a compressible helical spring H with spring-pads h and adjusting screw 49, shown in the adjustable 3-way relay valve of FIGURE 6.

The valve casing body sections C are each identical transverse sections of an elongated tubular valve casing, in which one or more interconnected and spaced valve members V are mounted in tandem for reciprocal movement therein. Each section C is a block of metallic or polyester resinous material having parallel and planar end surfaces 20 to abut the same surfaces of adjacent sections or parts composing the valve casing, and has a smooth central bore or passage 22, preferably cylindrical in cross-section, extending axially therethrough from end-to-end, and further has its end planar faces 20 rabbetted, as at 23, on its inner circumference at each of its ends to provide housing-grooves for the interchangeable valve-seats S, S′, S″ or S‴ or for a gasket G. The length of the inner circumference, forming the passage 22 of each section C between the rabbets 23, is preferably only sufficient to allow for the required movement of a valve member V which may be disposed therein. Each section C is provided with one port 24 in the center of one of its side walls to which a pipe or tube may be connected in any suitable manner to establish communication with the passage 22 for conveying the fluid, to be controlled, to and from the valve. Such pipes or tubes may be a supply pipe 25, a delivery pipe 26 for conveying the fluid to its functional end, for instance, as an instrumentality to be actuated thereby, or an exhaust pipe 27.

As shown, the ports 24 may be internally threaded to receive the threaded end of metallic pipes or to receive threaded nipples, not shown, to which plastic tubes are connected, or to receive a threaded plug 28 for closing the port, when the port is not to be used. The exterior configuration of the sections C is optional, but it is preferred that it be square in cross-section as shown, in order that the ported side of the section may be positioned at any one of four ninety degree (90°) angles to permit a more convenient arrangement of and easy attachment of the pipes or tubing 25, 26 or 27 to the valve casing without disturbing the general symmetry of the assembly valve structure or hampering the interfitting of the sections C and the axial alignment of the passages 20 thereof end-to-end.

The piston-cylinder sections C′ are used when a fluid pilot-actuator is employed at one or both of the ends of the assembled casing body sections C to shift the valve members V. Each piston-cylinder section C′ is identical with section C except that its passage or bore 22a is of slightly greater diameter to accommodate a piston head P of a larger diameter than the diameter of the valve members V so as to provide for a pressure differential relative thereto; and, further, the piston-cylinder section C′ is not provided with a port 24 in its side wall and has, preferably, a rabbet 23 only at one end face 20, which adjoins and abuts a similar face 20 of an adjacent casing section C, to receive and retain a portion of a valve seat S, S′, S″ or S‴.

An assembly of casing body sections C, forming a valve chamber, either with or without the interposition of a piston-cylinder section C′, is closed at one or both ends by a casing end-cap C″ and, where not so closed, are closed by a modified end-cap, as indicated at $C^7$ or $C^{10}$ in FIGS. 7 and 10, which latter end-caps are designed respectively for the application of a specific type of actuator for a valve assembly as will be explained later. The end-cap C″ are plates or blocks having the same exterior contour and, preferably, the same length as the sections C and C′ to align coaxially with the assembled sections, as shown. Each end-cap C″ has a passage or port 29, extending axially therethrough, to which a pilot line PL may be connected to a supply of fluid pressure to actuate the valve members at controlled intervals of time; and each end cap C″ has its inner face 20 counter-sunk for a distance, as indicated at 30, corresponding at least to the depth and width of the rabbets 23 of sections C and C′ so as to receive a gasket G or a portion of a valve seat and provides a space between it and the opposing face of a piston P. The inner face 20 of the end-cap C″ are adapted to abut an adjacent face 20 of an adjacent section C or C′, as the case may be.

The walls of the casing body sections C, C′ and of the end-caps C″ are provided with a series of spaced holes 31 extending axially through the wall thereof (four of such holes 31 being shown in the corner portions of each square sections) and disposed to coaxially align, when said sections and end caps are assembled in proper position, so that a stay-bolt B may be passed through each align series of holes, thus binding the casing elements or parts C, C′ and C″ in a firm unitary structure by means of nuts 32 or the like.

The valve members V are relative thin rigid discs disposed radially within and across the area of the passage 22 of the assembled casing sections C and are dimensioned so that their peripheries have sufficient clearance around the circumference of the passage 22 as not to score it or cause ruts or grooves therein. In other words, the peripheries of the valve members V do not have to have a sliding fit with the wall of the passage 22 and are, preferably, slightly spaced from it, thereby eliminating machining work. Each valve disc V is provided, in any suitable manner, with two threaded studs 33 projecting from its opposite faces, respectively, and coaxially aligned with its axially center and is connected to an adjacent valve disc member or to an adjacent piston P (or other actuator) by valve coupling rods R or R′. Each end of each coupling rod has an internally threaded bore 34 concentric with its axial center to receive and cooperate with the studs 33 on the valve discs V and pistons P, thus detachably connecting the valve discs V and a piston or pistons in spaced tandem relation. As shown in FIGS. 5, 6, 7, 8, 9 and 10, the coupling rods R′ are about one-half the length of the rod R and are used as guides or abutments, where needed, according to the type of valve being assembled. In all other respects, the rods R′ are the same as the rods R.

The piston-head P is a disc-like member having only one stud 33 (the same as studs 33 on the valve members V) projecting coaxially from one face thereof to be threadedly received in a threaded bore 34 of a coupler rod R or R′, as the case may be, and has a peripheral groove 34 to receive and retain an O-ring 36 which forms a sliding seal with the inner circumferential surface 22a of the piston-cylinder section C′, in which it is disposed.

The valve-seat members may be of four types interchangeable with each other and are designated S, S′, S″ and S‴, type S being shown in FIGS. 1 to 4, type S′ in FIG. 13 and types S″ and S‴ being shown in FIGS. 5, 5a and 5b.

Generally, the valve seat members are *annuli*, of rectangular form in cross-section, and of a yieldable or compressible material, such as rubber, neoprene, vinyl, nylon, or the like, each of said *annuli* being formed on its opposite faces, respectively, with bead or lip 37, of the same material and integral therewith, which project laterally outward from said faces at the marginal edge of its inner circumference, through which inner circumference the coupling rods R or R' may extend and which is dimensioned to be substantially spaced from the said rods to allow free passage therethrough of the fluid, to be controlled. The outer marginal portion of each annular valve seat is dimensioned to be fittedly received in the groove formed by the opposing rabbets 23 of two adjacent sections C and/or C' with its inner marginal portion projecting into the passage 22 of the casing for substantial distance so that the beads or lips 37 thereon will obstruct and be engaged by the outer marginal portions of the adjacent valve members V. At least the outer marginal portion of the annular valve seat members are slightly thicker than the width of the groove formed by two opposing rabbets 23 so as to be compressed and clamped between the walls of the rabbets 23, when the sections C and/or C' are assembled and the parts of the valve tightly drawn together by the nuts 32 on the stay bolts B and the ends of the face 20 of said sections C and C' and end-caps C'' are in binding contact. Thus, the valve-seats also form gaskets between the body sections C and C'.

While the above generally described the four types of valve-seats S, S', S'' and S''', it specifically describes S' shown in FIGURE 13, which is sufficient for use in most miniature valve structures obtainable by this invention, where the valve member assembly V–R is supported by pilot-piston P or by end-cap $C^7$ shown in FIGURE 7. All of these valve seats are interchangeable one with the other where the necessities of a valve structure require one type of said seat instead of one of the others.

The valve seats S are of a construction that may be more desirable for use in a valve of large size or capacity than miniature valve or where the valve members assembly V–R is not supported by piston P or the number of valve members V are of such number as required support and guidance instead of depending solely upon their connection with the pilot-pistons P, or upon the slidable mounting of the valve stem or rod R in an end-cap $C^7$, as shown in FIG. 7. Each valve seat S comprises three parts, namely, a supporting guide 40 (of metal or rigid plastic material) sandwiched between the two annular members 41 (of rubber or rubber-like plastic material).

The supporting guide 40 of the valve seats S is of annular disc-form and the central opening 42 therein is dimensioned to have the valve coupling rods R or R' extend therethrough with sufficient tolerance to permit easy relative sliding movement therebetween while giving support to the valve assembly. The inner marginal portion of the supporting guide 40 is provided with several spaced openings or slots 43 extending axially therethrough to permit free communication between the casing body section C. The annular members 41 are of a yieldable or compressible material and are arranged, respectively, on opposite faces of the supporting guide 40 and are dimensioned to be coextensive with the outer marginal face portions of the supporting guide 40 from the openings or slots 43 therein to its outer edge. The combined thickness of the guide disc 40 and the yieldable annular members 41 is slightly greater than the width of the groove formed between adjacent casing section C and/or C' by the rabbets 23 so as to be received in said grooves and to be clamped firmly in position with the inner marginal portions of the yieldable member 41 projecting into the passage 22 of the casing, when the face 20 of the sections are in abutting contact and bound together by the stay-bolts B. The outer faces of each yieldable annular member 41 is formed to provide a yieldable bead or lip 37 along and round the inner circumferential edge thereof extending laterally outward therefrom for engagement with the outer marginal portion of a valve member V. The yieldable annular members 41 may be bonded to the disc-collar 40 but it is preferred that they be separable elements.

The valve seats S'', shown in FIGS. 5 and 5a, are a modified form of a combined valve-seat, casing-section gasket and valve-stem guide S. Each seat S'' comprises an annular member 44 of yieldable or compressible material, the same as described and shown in connection with valve seat S' shown in FIG. 13, and is of a thickness slightly in excess of the groove formed by opposing rabbets 23 in casing sections C and C' when assembled, the difference being that the member 44 is formed with a relatively deep annular groove 45 in and around its inner circumference between its side faces. A disc-like supporting guide 40a, similar in all respect to the supporting guide 40, is removably inserted in the groove 45 but has its outer marginal portion of slightly less diameter than the member 40 so that it may be accommodated in the groove 45.

The valve seat S''', shown in FIGS. 5 and 5b are the same as described in connection with valve seat S'', next above, except that each supporting guide 40b thereof is devoid of the openings or slots 43 and has its inner periphery formed with an annular groove 46 in which is retained an O-ring 47 to seal with the valve-stem or connecting rod R or R'. This type of valve seat S''' is employed where it is necessary or desirable to avoid negative areas, for instance as shown in FIG. 5 between the pilot piston P or piston-cylinder section C' and the next adjacent valve casing body section C.

It is pointed out that the lateral projecting annular beads or lips 37, on the opposite sides of and at the inner perimeters of the valve seats S, S', S'' and S''', permit a good sealing contact with the disc-valve members V should there be a slight variation in the lengths of the casing body sections C, as for instance, due to the variations in the depth of the rabbets 23 axially of said sections. Also the position of the beads or lips 37, on the seat faces of said valve seats, allow the valve member or members V to shift with a snap-like action into position onto the next opposing seat, in the direction of the actuated movement of valve member or members V, when its seated seal is broken, due to a sudden increase in area on the previous seated face of the disc valve member or members V becoming exposed to the pressure of the fluid or air being controlled.

With the parts or elements thus far described, a multiplicity of multi-way poppet-type valves may be quickly and inexpensively assembled therefrom, including those illustrated in the drawings, which are shown for purpose of example.

Figure 3:
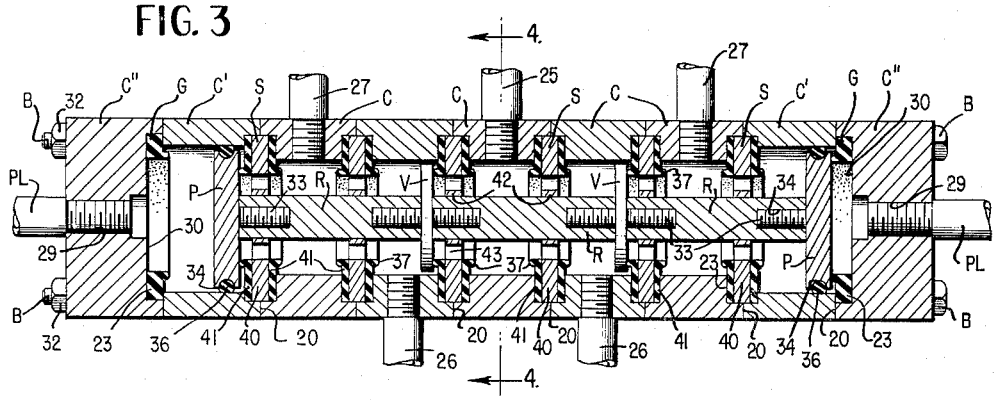
FIGURE 3 is a longitudinal sectional view and is taken substantially on line 3—3 of FIGURE 1.
Figure 4:
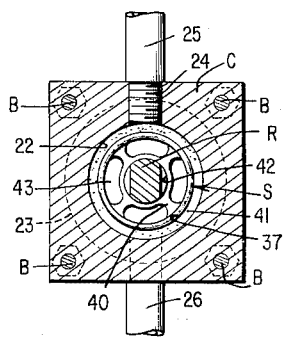
FIGURE 4 is a transverse sectional view of the valve which is taken substantially on line 4—4 of FIGURE 3.

The 4-way double air-piloted valve shown in FIGS. 1 to 3, inclusive, is constructed by assembling five casing body sections C in end-to-end relation with a piston cylinder section C' at each end of the assembled sections C, with six valve seats of either type S, S' or S'' interposed between the adjacent sections C and C', with two end-caps C'', one closing the open end of the piston-cylinder sections C' respectively, and with two disc-valve members V, one of which being disposed in each of the casing body sections C immediately adjacent the middle body section C and being interconnected by coupling-rods R which extend through the center openings 42 in the valve seats S, S' or S''.

The assembling of the parts may be accomplished by providing a suitable jig or holder, not shown, in or on which the parts are applied successively, starting with one end cap C'' containing gasket G, then applying a piston-cylinder section C', then inserting a piston P to which a coupling rod R has been threadedly attached, then applying a valve seat S in the rabbet 23 of section C', then applying a casing body section C followed by the next valve-seat S, then threadedly connecting a disc-valve member V to the coupling rod R and, then, next applying casing body section C, and so continuing until the assembly has been completed as shown in FIGS. 1 to 3 inclusive. During or after the parts were so assembled, the stay bolts B of proper length are inserted through the opening 31 and the housing parts firmly bound together in clamped leak-proof relation by the nuts 32 on the ends of the bolts B.

After so assembling a 4-way double air-pilot valve as shown in FIGS. 1 to 3 inclusive, the plugs 28 (such as shown in FIGS. 6, 7, 8 and 9) are removed to open the ports 24, and a pressure supply pipe 25 is connected to the port 24 of the middle casing-body section C, a fluid delivery pipe 26 is connected to each port 24, respectively of casing-body sections C immediately adjacent the middle body section C, and an exhaust pipe 27 is connected to each of next adjacent body sections, as shown particularly in FIG. 3.

In the same manner as just described in connection with FIGS. 1 to 3 inclusive, a single-pilot spring-returned 3-way valve, shown in FIG. 5, may be assembled from some of the same parts or elements which compose the double-pilot 4-way valve; or the double-pilot 4-way valve may be converted into this 3-way valve by omission of two valve casing body sections C, one piston cylinder C' and its piston P, three valve seats S, S' or S'', one disc-valve V, two coupling rods R and by the addition of a compression spring H, of a short coupling rod R' and of one gasket G. The short coupling rod R' is threaded onto a stud 33 of the single disc-valve member V on the side thereof which is not opposite the pilot-piston P and extends through the support guide 40 of the next adjacent valve seat S''. A stud 48 is threaded in the bore 34 in the free end of the coupling rod R', a helical compression spring H is interposed between and bears against the inner face of the end-cap C'' and the free end of the coupling-rod R', one end of said spring being retained in a depressed portion of the end-cap and its other end being retained in position by a stud 48 threaded into the bore 34 in end of the coupling rod R'.

In the valve shown in FIG. 5, it may be found desirable to employ, as shown, the valve seat S'', described above, for cooperation with the single disc-valve V employed; and it may be found desirable also to employ, as shown, the valve seat S''', described above, as a sealing partition between the piston-cylinder C' and against which a face of the pilot-piston P abuts. In this arrangement, a small vent opening 70 is drilled through the wall of the piston cylinder C' adjacent its rabbet 23 to relieve back pressure, when pilot-air, under pressure, is admitted to the piston P through port 29 in the adjacent end cap C'' to actuate the piston P. The inlet or supply pipe 25, the fluid delivery pipe 26 and the exhaust pipe 26 are connected to the assembled valve casing as shown in FIG. 5, in which case the port 29 in the other end-cap C'', adjacent the spring H, may or may not be closed by a screw-plug 28.

Similarly, a variably adjustable spring-returned valve, shown in FIG. 6, may be assembled with the same parts and in the same manner as the valve shown in FIG. 5, but with the addition of an elongated adjusting screw 49 threaded in the ports 29 of the end-cap C' at the opposite end of the assembly from the pilot-piston P and of abutment pads h for the spring H, one pad bearing against and held in position by the stud 48 and the other pad bearing against and held in position by the inner end of the adjusting screw 49. While FIG. 6 shows the valve as a 3-way valve, the same arrangement may be employed with 4-way or other multi-way spring-returned valves.

FIGURE 7 shows a cam-operated spring-returned 3-way valve that may be assembled independently from the most of the same elements or parts shown in FIGS. 1 to 3. If converted from the latter, both piston-cylinders C', their pistons and adjacent valve seats S are omitted from the assembly as well as one casing body section C that was adjacent the right-hand piston-cylinder P (shown in FIGS. 2 and 3). The left-hand end-cap C'', shown in FIG. 7, may have its port 29 plugged, as at 28, and a helical compression spring H is interposed between said end-cap C'' and a short coupling-rod R' (the same as shown in FIG. 5). The right-hand exhaust pipe 27, shown in FIGS. 1 to 3, is removed and replaced by a screw-plug 28 in the port 24 and, if desired, the first right-hand valve seat S may be replaced with a valve S''' (shown in FIGS. 5 and 5b). However, the right end-cap C'' (shown in FIGS. 1 to 3) is replaced by end-cap $C^7$, shown in FIG. 7, which is the same in all respects to the end-cap C'', except that the axial port or bore 29a in end-cap $C^7$ is not threaded and is of a diameter to have a coupling-rod R extend therethrough with a sliding fit; and this bore 29a is formed with a laterally groove 50 to receive and retain an O-ring 51, therein, which engages about the coupling-rod section R to form a seal against leakage of fluid that is within the valve casing. A wear-button or plate 52 is mounted on the free end of the rod section R projecting outwardly beyond the end-cap $C^7$ and against which a camming means 53 engages to shift the valve member assembly V–R to the left at timed intervals or when desired.

Instead of the camming mechanism 53, the valve assembly V–R may be actuated in one direction by diaphragm means $C^{10}$, shown in FIG. 10, and which valve assembly is the same in all respects to FIGURE 7, except for the diaphragm means $C^{10}$ which is substituted for the end-cap $C^7$. The diaphragm means $C^{10}$, comprises two complemental cup-like members x and y arranged edge-to-edge to form a housing, in which is disposed a diaphragm 54 with its outer marginal edge portions clamped between the meeting edges of the assembled cup members by bolts 55. The bottom wall of the cup member x is provided with an aperture 56 conforming with the passage 22 in the valve casing C and through which a coupling rod R extends into the housing x–y and is connected to the axially center of the diaphragm washers 57 and nut 58 on a stud 59 threaded in the bore 34 of the coupling-rod R. The bottom face of the cup member x is rabbetted, as at 23, around the corner edge forming the aperture 56, so as to cooperate with the rabbet in an adjacent casing section C to form a groove for receiving a valve seat S, S', S'', or S''', as the case may be; and is provided further with 4 holes to align with holes 31 in the casing sections C to receive the stay-bolts B, which bind the diaphragm means $C^{10}$ to the valve assembly. The cup member y of the diaphragm housing is formed with a port 29 through which pilot fluid pressure is intermittently admitted through pilot line PL to actuate the diaphragm 54 and, hence, the valve member assembly V–R in the valve casing assembly C.

FIGURE 8 shows a shuttle valve which may be assembled or constructed of three casing body sections C, two valve-seats S, or S'', one disc-valve member V disposed between the two valve-seats and two short coupling-rods R' connected thereto on its opposite sides to extend through the center openings in the valve seats, respectively. In this arrangement, the ports 29 in both end-caps C'' may be connected, as shown, to inlet supply pipes 25 conveying the fluid that is controllably directed to and through the delivery pipe 26 by the shifting of the valve member V; or one or both of the screw plugs 28 may be removed from the ports 24 in casing sections C and, a pipe or pipes 25 connected with said port or ports 24, in which case the port or ports 29 in the end-caps C'' will be closed by the screw plugs 28. The helical compression springs H may or may not be employed at both ends of the valve member assembly V–R', depending upon the degree of pressure of the fluid introduced through the supply pipes 25 and the degree of snap-action required for the operation of the disc-valve member V.

FIGURE 9 shows a quick-release or quick exhaust valve, which is assembled or constructed the same as and with substantially the same number of elements or parts as is the shuttle valve shown in FIGURE 8, but differs by including at least one helical spring H and a variation in piping thereto. In this quick exhaust or release valve, either one of the ports 29 in an end-cap C″ (as shown at the left in FIG. 9), or the port 24 in the casing section C adjacent thereto, may act as the inlet supply of the fluid to be delivered to outlet pipe 26 by the single disc-valve member V. In this arrangement, the port 29 in the other end-cap C″ (shown at the right in FIG. 9), or the port 24 in the casing body section C adjacent the said right-hand end-cap C″, or both, may become the exhaust port or ports and may be connected, if desirable, to exhaust pipes 27. On this exhaust sides of the valve-member V, a helical spring H is interposed between the end of the short coupling rod R′ and the right-hand end-cap C″ to quickly shift the valve member V to the left (as shown in FIG. 9) against a valve seat S, when the pressure of the fluid supplied at 25 to the valve casing has been relieved or discontinued.

It is sometimes desirable or necessary to mount the valves above described, or valves that may be formed from the parts above described, upon a base to which the various pipings are connected. FIGURE 11 shows a base plate 60 upon which a valve casing assembly C–C′–C‴ may be mounted. The plate 60 will be of different lengths according to the type or length of the valve assembly that is mounted thereon; and the ports 24 in the valve casing section C will be arranged in the same plane or same side of the valve assembly so that the ported side of the valve assembly will lie against the plate.

The upper face of the base plate 60, against which the ported side of the valve assembly will lie, is formed with a channel 61 dimensioned to fittedly receive the valve assembly and is provided with a plurality of ducts or passages 25a, 26a or 27a, extending therethrough so as to communicate the bottom of the channel with an outer surface of the base plate. These ducts or passages may be of such number as required for any particular valve assembly mounted on the plate.

In order to provide against leakage, a gasket-mat 62, (preferably of a rubber-like material) covers the entire area of the bottom surface of the channel 61 and is provided with ports 63 therethrough which are positioned to register with the ports 24 in the valve assembly and the corresponding duct or passage in the base plate. The gasket-mat 62 is also provided with ports 63a, one in each end portion thereof, to the end-caps C″ for the purpose as will presently appear. The upper face of the gasket-mat 62 is formed with a groove 64 which communicates with the ports 63 and 63a, the groove being closed when the valve assembled is clamped to the base plate 60. All of the ports 63 and 63a, that may be provided in the gasket 62, may have their communication with the groove closed by hollow cylindrical rubber-bushings 65, the length of which are of the same thickness as the gasket-mat 62 and the diameter of which are such as to fittedly and removably engage in the ports 63 and 63a. Thus, by the selective insertion of the bushings 65 in the ports 63 and 63a, the gasket-mat may be conditioned for the functioning of the particular valve assembly with which it is employed.

To assure the proper register of these ports 24 in the valve assembly and the ports 63 and 63a with the ducts or passages 25a, 26a and/or 27a, the channel of the base plate 60 is provided at one end thereof with a stop abutment 66 against which the gasket-mat 62 and the valve assembly will engage and abut for properly locating them in the channel. When so properly located, the valve assembly is secured to the base by bolts 67 extending through the four corner portions of the base plate and through cross-bars 68 disposed across the top surface of the valve assembly.

The valve assembly, that is shown in FIGS. 11 and 12 of the drawings as mounted on the base plate 60, is a single air-piloted air-returned 3-way valve, which comprises three casing body sections C, two piston cylinder sections C′, one at each end of the casing section assembly, respectively, with valve seats, S, S′ or S″ mounted therebetween, the piston section C′ each being closed by an end cap C″. Each of the piston cylinders contain a piston P, which are connected to a single disc-valve member V by coupling rods R, the valve member V being disposed in the middle casing section C. One end cap C″ (shown at the right-hand side in FIG. 12) has its port 29 connected to a pilot or pressure supply PL. The other end-cap C″ (at the left-hand side of FIG. 12) has its port 29 plugged by a screw plug 28 and has been drilled to form a passage 69 extending from one outer side face of the end cap, which rest against the gasket 62, to and through the inner end face of said end cap.

Hence, with the parts clamped together in the manner shown in FIG. 12, the operation of the valve 12 is as follows: When pilot air or fluid is admitted in port 29 of the end cap C″, at the right-hand end of the valve assembly shown in FIG. 12, piston P in the next adjacent cylinder C′ is moved to the left and abuts the bead 37 on the adjacent valve seat S. This movement shifts the valve member V from its seat, as shown in FIG. 12, to the left to abut the bead 37 on the valve seat S opposing this movement and, thus, closes upon the opposing seat. This movement of the valve member V opens communication between the inlet supply port 25a (of the fluid being controlled) and the delivery port 26a. Since the port 63 in the gasket-mat 62, communicating the delivery port 24 of the valve assembly with the delivery passage 26a in the base plate, is devoid of an insert bushing 65, as is the port 63a in the gasket-mat 62 underlying the drilled passage 69 in the left-hand end-cap C″, a portion of the air or fluid, so delivered to the port 26a also flows through the groove 64 and the drilled passage 69 into the piston cylinder C′ at the left end of the valve assembly, as shown in FIG. 12; but this pressure will not shift the left-hand piston P to the right because the area thereof exposed to this diverted pressure is less than the area of the face of the other right-hand piston P exposed to the pressure from the pilot line PL and of the surface of the valve member V exposed to the pressure from the fluid supply inlet 25a. Hence, the valve member assembly V–R–P will remain in its shifted position to the left as long as air is in the pilot line PL. However, when the pilot line PL is vented, the air being admitted into the left-hand piston cylinder C′ by the drill passage 69 will act, under full pressure, upon the face of piston P therein, which is greater than the face of the valve member V exposed to the same pressure, and shift the valve assembly V–R–P to the right (as shown in full lines in FIG. 12) and the valve member V will engage the bead 37 of the opposing valve seat to shut off supply from passage 25a to the delivery passage 26a. The valve member V, now being in the position shown in FIG. 12, also allows the delivery passage 26a to vent or exhaust through the exhaust passage 27a as well as venting the left-hand piston cylinder C′ through drill passage 69, groove 68, port 24 (corresponding to delivery passage 26a) and through exhaust passage 27a in order that a repeated operation, as just described, can take place. The valve will remain in its full line position as shown in FIG. 12, until another impulse is received from the pilot line PL, because the inner face of the piston P at the right-hand end of the valve assembly, which is exposed to the pressure in the valve assembly emanating from the supply inlet 25a, is of greater area than the face of the valve member V exposed to the same pressure, thus the parts will be held in the full line position by the differential of pressure.

The construction of the valve parts, herein shown and described, not only permit the assembly of a large number of multi-way valves of different types, but also the production of such valves in miniature size much smaller than those now on the market. For instance, the valve casing sections C, C′ and C″ may each be three-quarters (¾) of an inch square and have an axial length of about three-eighths (⅜) of an inch, thus permitting a 4-way valve, as shown in FIGS. 1 to 3, inclusive, to be assembled having a thickness of three-quarters (¾) of an inch and a length of about three and one-quarter (3¼) inches as now devised. The rabbets 23 are about one-sixteenths (1/16) of an inch deep from the planar surfaces 20 of the sections C, C' and C" and the outer marginal portions of the valve seats S, S', S" and S''' have a slightly oversized thickness of about one-eighth (⅛) of an inch, while the ports 24 and 29 are of a size as will receive tubing having an internal diameter of one-eighth (⅛) of an inch. With these dimensions given of the valve sections C, C' and C", the dimensions of the other parts will be proportionate thereto as shown in the drawings.

Inasmuch as the sizes of the parts, just stated, will give a capacity through a valve assembly greater than that obtainable with tubing or pipes having an internal diameter of one-eighth of an inch (⅛" I.D.), it is possible that their dimensions may be decreased or reduced to provide a valve having still smaller overall dimensions so long as a ratio of the openings through the valve seats S, S' or S" and the cross-sectional area of the coupling rods R or R' are approximately .64 and .36, respectivey, to 1.00, the cross-sectional area of the valve chamber sections C.

Obviously, the parts may be made of larger size for the construction of valves of larger capacities; but the desideratum of this invention is the construction of miniature valves that are useful in pneumatic logic control circuitry.

Due to the construction of the sectionalized valve parts, a multiplicity of valves, which may be constructed according to the present invention and of which a few are shown in the drawings by way of examples, operate as a spool valve but with the quick snap action of a poppet-type valve as the relative thin disc-valve members V are positioned between and cooperate with the opposing faces of the removable and interchangeable seats S, S', S" or S''' uniformly spaced within and along the elongated valve casings.

Among the advantages of the present invention are:

(1) The sectionalized body casing of interchangeable parts and the sectionalized movable valve assembly of interchangeable parts permit the assembly of various types of valve assemblies of miniature size which will operate at substantially lower pressure in logic circuitry and, hence, permitting such circuitry to be accomplished at less operating costs than heretofore due to the drastic reduction in air consumed;

(2) All standard 2-way, 3-way and 4-way (plus 5-way, 6-way, etc.) as well as quick-release valves, shuttle valves, variable spring release valves and many others can be assembled from the sectionalized parts by the selection of the number of body sections and internal valve member parts required according to the number of operations or functions to be performed by the valve or the devices to be controlled thereby;

(3) The construction of the groups of sectionalized parts permit the assembly of many types and categories of full capacity valves having functions not readily obtainable in the conventional spool-valves or rotary valves;

(4) The travel of the valve members V are held to a minimum of little less than three eigths of an inch, thus increasing the speed of the valve shift from one opposing valve seat to the other;

(5) As many casings section C and valves V may be employed in any assembly as may be required for any particular type of valve, provided the accumulated differential, produced by the surfaces of the valve members V exposed to pressure, do not equal or exceed the area of the pilot pistons P, except where the valve member is actuated by a solenoid or by a camming mechanism 53, as shown in FIG. 7. Where the valve is air-pilot actuated and such a differential is exceeded, a large diaphragm actuator $C^{10}$, shown in FIG. 10, may replace the smaller pilot piston P and permit much greater sensitively for high air transmission speeds;

(6) Inasmuch as fairly wide clearances are provided between the operable parts, no lubrication is required and the sealing of the valve is by poppet action against the compressible seat and Teflon rings are employed as seals on the pilot pistons P and on the valve rods, such as at 47 in FIG. 5 and 51 in FIG. 7, thus resulting in a minimum of wearing parts;

(7) The arrangement of the parts is such that the shiftable valve member assembly, in valves employing air-pilot piston P, maintains its shifted position after momentary pilot impulse from line PL and the valve area differential is in favor of holding position attained, thus preventing creepage;

(8) Since the normal pressures involved will be in the order of 100 p.s.i. or less, the internal parts of the valve construction may be of non-metallic material;

(9) All known valve actuators can be easily applied to either or both ends of the valve assembly, as shown by way of example in FIGS. 7 and 10;

(10) Valve assemblies can be produced, in accordance with the present invention, that can perform all the logic functions of "AND," "OR," "NOT," "MEMORY" and "TIME" in miniature size and throughout the normal range of sizes up to three quarters (¾) of an inch and one (1) inch capacities;

(11) To reduce piping and make a more compact installation, it is possible to manifold several casing body sections C in several ways to receive and segregate control functions—as, for instance, several sections C, that are to be fed supply pressure, could be in one unit with internal coring to admit supply pressure to several valves with one pipe connection;

(12) Up to four ports can be tapped into each body section C to direct up to four signals from a single valve—as to a gauge, to miniature lubricators for oiling cylinders on the downstream side of the valve, etc.; and

(13) The manifolding of certain sections C can alter the valve configuration, such as a shortening a 4-way, all ports open into a neutral valve, as well as to permit valve groupings to obtain functions and sequencing not readily attainable by present spool or rotary valves—such as one-shot cycle etc.

Having thus described the invention and the manner in which the same is to be performed, it is to be understood that the invention is not limited to the exact detailed construction of the various parts herein shown and described as modifications or variations may be made therein without departure from the spirit of the invention and the invention is to be limited only by the scope of the appended claims.

That which is claimed, as new and to be secured by Letters Patent, is:

1. In a fluid-pressure control a valve assembly, a series of identical and interchangeable casing body sections arranged end-to-end, each section having a bore therethrough in substantial coaxial alignment with adjacent sections to form a valve-chamber and each having a lateral port in the side wall thereof closed by a removable plug and connectible to conduits for fluid pressure to be controlled; an end-cap, and a gasket therefor, disposed at each end of the casing assembly; a combined gasket and valve seat means interposed between adjacent casing body sections, each of said means including an annular member having opposite faces of compressible material with its inner marginal portion projecting radially inwardly for a distance into the chamber formed by said bores to provide valve-seats on its opposite faces; means securing the body sections and the end-caps in assembled relation and clamping the outer marginal portion of said annular member between said body sections; a unitary valve member assembly composed of interchangeable parts and disposed within and mounted for reciprocal shifting movements longitudinally of the chamber of the assembled body sections, said shiftable valve assembly including a plurality of disc-form valve members each selectively disposed in one of the body sections, and spacer coupling rods detachably connected to said disc-valve members and extending through the center of the annular combined gasket and valve seat means in spaced relation therefrom, the disc-form valve members being dimensioned to have their opposite faces alternately abut and sealingly engage opposing faces of adjacent valve seats, and actuating means mounted at the ends of said valve-member assembly for shifting the latter to alternate valve-seating positions to direct fluid, to be controlled through the valve assembly whereby valves having different functional operations may be assembled by a selection of the required number of casing sections, of disc-valve members and coupling rods therefor and by selectively unplugging the ports in the body sections to provide the proper inlet and outlet openings in the valve casing.

2. A valve assembly as set forth in claim 1 wherein each outer face of said compressible material has integrally formed thereon at its inner marginal portion a laterally projecting bead therearound forming said valve seats.

3. A valve assembly as set forth in claim 1, wherein a coupling rod at one end of the shiftable valve member assembly projects through and beyond the adjacent end-cap for an operative connection with an actuator to shift said valve member assembly to one of its seated positions, and means at the other end of the valve member assembly and within said valve casing assembly mounted and positioned to bias said valve member assembly to its other seated position.

4. In a fluid-pressure control a valve member assembly for use in a sectionalized valve casing having radially inwardly projecting spaced annular valve seats in an elongated valve-chamber, said assembly comprising at least one disc-form valve member reciprocably disposed in said chamber between opposing valve-seats and having a threaded stud extending centrally from its opposite faces respectively, and coupling rods each having an internally threaded socket at each end thereof to cooperatively receive said studs, one of said rods being connected to a stud of each valve member, respectively, to form a supportable valve-stem therefor, whereby another identical valve member may be connected to the other ends of said coupling rods to form a tandem unitary multi-valve member assembly.

5. A valve assembly as set forth in claim 4 further characterized by each of the faces of the inner marginal portion of said annular valve-seats being formed with an integral outwardly and laterally projecting continuous bead therearound forming said valve seats thereon.

6. A fluid control valve assembly comprising a series of identical and interchangeable sectionalized separable homogeneous rigid valve casing-sections arranged linearly end-to-end to form an elongated valve-chamber therewithin and each having a lateral port therein communicating with said valve-chamber and serving for connection with conduit means for the fluid to be controlled; a combined gasket and valve-seat means comprising double-faced annular members of a gasket-like material, one positioned between the adjacent ends of each of the several casing-sections to provide sealing means therefor and each annular member having an inner marginal portion projecting radially inwardly of the valve chamber to form annular valve-seats on its opposite faces; a shiftable valve-member means disposed wholly within said chamber and including one disc-form valve-element disposed transversely in certain of the selected casing-sections respectively to cooperate with the valve-seats at the opposite ends of such section in which it is disposed according to the function to be performed by said valve assembly and, further, including disconnectable coupling-rods extending axially of the valve-member means and through and spaced from said valve-seats to detachably interconnect said valve member means as a movable unit and to permit communication between the casing-sections composing said chamber; cap-means closing each end of said valve-chamber, said cap-means providing for the operative disposition of actuator means, at least one actuator means being associated with one of said cap-means and to which an adjacent end of the valve-member means is responsive to shift the latter to different seated positions; removable means for manually closing certain of said ports in the casing sections to afford a predetermined flow of fluid, to be controlled, to and from the valve assembly in accordance with the function to be performed by said valve assembly; and means for binding said casing-sections, said cap-means and said annular members in an operable assembly.

7. A valve assembly as set forth in claim 6, wherein there is a support and guide means for the valve member assembly inserted between the opposite faces of each of said annular members and formed with a ported portion extending radially inward from said valve seats and surrounding said rods to give support and guidance to the valve member assembly.

8. A valve assembly as set forth in claim 6, wherein each end face of the valve casing sections is formed with a rabbet around the end edges of its inner circumference, which rabbets in adjacent ends of the assembled sections cooperate to form a groove at the meeting end faces of said sections for the reception of the outer marginal edge portion of one of said combined gasket and valve-seat means and between which it is clamped when the end faces of said casing sections are secured together.

9. A valve assembly as set forth in claim 6, wherein at least one of said actuator means is an open-ended piston-cylinder section interposed axially and clamped between an end-cap and the adjacent casing body section, a pilot piston-head disposed in said cylinder and detachably and operatively connected to an end of an adjacent coupling rod, and the end-cap adjacent said piston having a port therethrough extending from the inner face of said cap to a point exterior thereof and connectible to a source of fluid pressure supply.

10. A valve assembly as set forth in claim 9, wherein there is another actuator means associated with the other end-cap and which is a compressible spring interposed between said end-cap and the adjacent end of the shiftable valve member assembly for biasing the latter to one of its seated positions.

11. In a valve assembly, as set forth in claim 6 wherein the exterior ends of the ports in the valve chamber face on one side of said valve casing, a base-plate having a channelled surface adapted to fittedly receive and retain the ported side of the valve assembly therein and having ducts therethrough communicating with said channelled surface and of such number as at least correspond to the number of inlet and outlet ports in the valve casing for the fluid to be controlled; a gasket-mat positioned on the bottom of said channelled surface between the latter and the ported side of said casing and having a plurality of ports therethrough, corresponding to and communicating with the ducts in the base plate, and having other ports therein to register with other ports in the valve casing; at least one groove in one face of the gasket-mat in communication with all of the ports in said gasket-mat for transferring said fluid; gasket bushings fittedly inserted in certain of said ports in the gasket-mat to selectively close communication between said ports and said groove, according to the operation to be performed by the valve assembly; and means for clamping and securing said valve assembly to said base-plate and upon said gasket-mat with the ports thereof in registered position with the ports in said gasket-mat.

12. In a valve assembly of the type having an external elongated valve-casing composed of a plurality of rigid and separable valve-casing sections of substantially the same size and length having a lengthwise bore therethrough and a lateral port communicating with said bore and connectable with conduits for the fluid to be controlled, said sections being arranged end-to-end with their bores in alignment to form an elongated cylindrical valve-chamber, and separable cap-means positioned at the ends of said assembled casing-sections for closing the ends of said chamber; the improvement comprising the ends of each casing-section being formed with a circumferential rabbet at its inner corner portions to form, with the rabbet of an adjacent casing-section, an internal annular groove within the valve-chamber; annular members of gasket-like material, one of which being positioned in each of said grooves between adjacent casing-sections, said annular members being dimensioned to have their outer marginal circumferential portions form a seal between said sections, when the latter are secured together, and their inner marginal circumferential portions projecting radially inwardly into the valve-chamber to form valve stop abutments with valve-seats on their opposite faces; a shiftable unitary valve-member means disposed within said valve-chamber and comprising at least one disc-form valve-element disposed only in one casing-section and shiftable between said valve-seats at the ends thereof, and being dimensioned to have less than a sliding-fit with the wall of the valve-chamber and to engage alternately and seat against the opposing seat-faces of two adjacent annular members; disconnectable valve-element coupling means, including rod sections each having interconnecting elements at their ends and connected to and extending from each face of said valve-element through and spaced from said seat members to allow fluid communication of said casing-sections; actuating means at the outer ends of said valve-element coupling means for reciprocating the latter to shift the valve-member means to open or close certain of said valve-seats selectively to direct the flow of fluid, to be controlled, through the valve assembly; means binding said casing-sections, cap-means and annular members together in operable assembly; and means for removably closing certain of the ports in accordance with the functional operation to be performed by said valve assembly.

13. A valve assembly as set forth in claim 12 further characterized by at least one of said actuating means including a piston cylinder positioned between one of said end-caps and the adjacent end of the valve casing assembly, a pilot piston mounted in said cylinder and detachably connected to the shiftable valve member assembly for shifting the latter in one direction, and biasing means at the other end of said valve-member assembly and within the valve-chamber for shifting the valve member assembly in the opposite direction.

14. A valve assembly as set forth in claim 12, further characterized by a supporting guide means for said shiftable valve member assembly comprising a disc inserted between opposite wall portions forming the opposite faces of each annular member and having a center opening therein through which said coupling rods slidably extend and having apertures through its inner marginal portion between its inner circumference and of said valve seats to permit free communication between the sections composing the valve casing.

15. A valve assembly as set forth in claim 14, wherein at least one of the supporting guide discs is devoid of the communicating apertures and its center opening has a sealing contact with the coupling rod slidably extending therethrough to form a sealed partition within said valve-chamber.

16. A valve assembly as set forth in claim 12, wherein the detachable connection between the disc-valve element and said coupling rods comprises threaded studs projecting from the center of the opposite faces of the disc-valve element and threaded sockets in the ends of said coupling rods which cooperatively receive said studs.

17. A fluid pressure control device composed of interchangeable parts for providing an elongated valving means of the poppet-valve type capable, by addition and reduction of said parts, to perform various valving functions, said elongated valving means comprising a pair of spaced end-caps closing the ends of said valving means and having a passage therethrough, and at least three rigid and identical block-like members each having a bore therethrough with a lateral port therefor and arranged in end-to-end linear alignment between said caps to provide an external ported valve-chamber; a double-faced annular member of a gasket-like material positioned between the adjacent ends of the several casing-sections to provide sealing means therefor and each annular member having an inner marginal portion projecting radially inwardly of the valve-chamber to form annular valve-seats on its opposite faces; a shiftable valve-member means of interchangeable parts wholly within said chamber and including a separable disc-form valve-element disposed transversely in the intermediate casing-section to cooperate with the opposing valve-seats at the ends of said section and with the adjacent casing sections being devoid of said valve-elements therein, said valve-member means further including valve-element connecting-rods having a disconnectable coupling means at the ends thereof and connected to and extending axially from the valve-element and through and spaced from said valve-seats to provide communication between said casing-sections; actuator means associated with each said cap and operatively connected to the terminal ends of the rods on the valve-member means to shift the valve element to alternately open and close its cooperating valve-seats; removable plugging means for manually closing certain of said ports in the casing-sections and the passages in said end-caps to afford a predetermined flow of fluid pressure, to be controlled, into and out of the valve assembly in accordance with the function to be performed by said valve assembly; and releasable means for securing the casing-sections and said end-caps in a unitary structure and for biasing and holding said annular members in position.

18. A fluid pressure control device as set forth in claim 17 including at least two additional valve-casing sections identical with said first valve-casing sections interposed between an end-cap and the first said valve-casing sections with annular members disposed and arranged there between as aforesaid, and a disc-form valve element disposed transversely in the additional casing-section adjacent to one of said first valve casing-sections devoid of such valve-element and detachably connected on one side to the coupling rod of the said first valve- element and has another coupling rod connected to and projecting from its other side.

19. A fluid pressure control device as set forth in claim 17 wherein the actuators are fluid pressure actuated means interposed between the end-caps and the adjacent valve-casing sections and communicating with the passages in said end-caps which latter are connectable to a source of fluid pressure.

20. A fluid pressure control device as set forth in claim 17 wherein said actuators comprise biasing springs interposed between said caps and the adjacent rods of said coupling rods, and wherein the passages in said caps are connectable to a source of fluid pressure supply to be controlled, and the port in the intermediate casing-section is connectable to a fluid-delivery conduit, and said removable plugging means closing the ports in the other casing-sections, thereby providing a shuttle valve.

21. A fluid pressure control device as set forth in claim 17 wherein said actuators comprise compression springs, the passage in one end-cap being connectable to a source of fluid pressure supply and its adjacent casing-sections being closed by a removable plugging means, the port in the intermediate casing-section being connectable to a delivery conduit, the port in the other casing-section and the passage in its adjacent end-cap being open to provide exhaust openings, and the said compression spring on the exhaust side of the device being of greater force than the other spring, thereby providing a quick exhaust valve.

22. A fluid pressure control device as set forth in claim 17 wherein the actuator at one end of the valve-member assembly is a compression biasing spring and the passage in the adjacent end-cap is closed by a removable plugging means; and the actuator at the other end of the valve-member assembly is a fluid pressure actuator in communication with the passage in the adjacent end-cap, which latter passage is connectable to a source of fluid pressure.

23. A fluid pressure control device as set forth in claim 22 wherein the plugging means in said end-cap is adjustable in the passage of its end-cap and bears upon the end of said spring to vary the compressive force of said spring.

References Cited by the Examiner
UNITED STATES PATENTS

| | | | |
|---|---|---|---|
| Re. 25,251 | 10/62 | Quail | 251—361 XR |
| 2,220,782 | 11/40 | Downey | 251—361 |
| 2,481,460 | 9/49 | Williams | 251—361 |
| 2,660,398 | 11/53 | Bashark | 251—361 |
| 2,840,110 | 6/58 | Parsons | 137—625.27 |
| 2,911,994 | 11/59 | Branson | 137—270 |
| 2,915,086 | 12/59 | Godshalk | 251—361 XR |
| 2,947,320 | 8/60 | Oxley et al. | 137—271 |
| 2,969,775 | 1/61 | Thelen | 137—625.5 X |
| 2,991,805 | 7/61 | Page | 137—625.27 |

FOREIGN PATENTS

| | | |
|---|---|---|
| 1,072,038 | 12/59 | Germany. |
| 1,138,990 | 10/62 | Germany. |

References Cited by the Applicant
UNITED STATES PATENTS

| | | |
|---|---|---|
| 2,728,353 | 12/55 | Bonham. |
| 2,747,611 | 5/56 | Hewitt. |
| 2,784,738 | 3/57 | Thurber. |
| 2,792,017 | 5/57 | Wiczer. |
| 2,807,280 | 9/57 | Kittredge. |
| 2,834,368 | 5/58 | Gray. |
| 2,965,131 | 12/60 | Oros. |
| 3,020,927 | 2/62 | McLaughlin. |

M. CARY NELSON, *Primary Examiner.*

LAVERNE D. GEIGER, *Examiner.*